United States Patent
Chai et al.

(10) Patent No.: US 9,538,358 B2
(45) Date of Patent: *Jan. 3, 2017

(54) COMMUNICATION MATCHING METHOD, USER EQUIPMENT AND BASE STATION

(71) Applicant: Huawei Technologies Co., Ltd., Shenzhen (CN)

(72) Inventors: Li Chai, Beijing (CN); Bo Lin, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,128

(22) Filed: Apr. 14, 2016

(65) Prior Publication Data

US 2016/0234671 A1 Aug. 11, 2016

Related U.S. Application Data

(63) Continuation of application No. 14/266,320, filed on Apr. 30, 2014, now Pat. No. 9,338,707, which is a (Continued)

(30) Foreign Application Priority Data

Nov. 4, 2011 (CN) .......................... 2011 1 0345913

(51) Int. Cl.
*H04W 8/00* (2009.01)
*H04W 76/02* (2009.01)
(Continued)

(52) U.S. Cl.
CPC ......... *H04W 8/005* (2013.01); *H04W 36/0083* (2013.01); *H04W 76/023* (2013.01); *H04W 8/24* (2013.01)

(58) Field of Classification Search
CPC ........... H04W 36/0083; H04W 76/023; H04W 36/30; H04W 24/08; H04W 72/082; H04W 60/04; H04W 76/028; H04W 36/08; H04W 28/04; H04W 28/18; H04W 48/20; H04W 88/06; H04W 84/18; H04W 24/00
See application file for complete search history.

(56) References Cited

U.S. PATENT DOCUMENTS

2009/0138584 A1* 5/2009 Choi .................... H04L 67/104
709/223
2013/0109301 A1* 5/2013 Hakola ............... H04W 76/023
455/39

(Continued)

FOREIGN PATENT DOCUMENTS

CN          103037448 A     4/2013
WO     WO 2010049801 A1     5/2010
(Continued)

OTHER PUBLICATIONS

Wang et al., "LTE-Advanced Device-to-Device," Modern Science & Technology of Telecommunications, pp. 24-28, Beijing, China (Jul. 2010).

(Continued)

*Primary Examiner* — Chuong A Ngo
(74) *Attorney, Agent, or Firm* — Blakely, Sokoloff, Taylor & Zafman LLP

(57) ABSTRACT

The present invention provides a communication matching method, a user equipment and a base station. The communication matching method includes: obtaining, by a second user equipment supporting a D2D function, D2D capability information of a serving base station of a cell to which the second user equipment currently belongs; obtaining, by the second user equipment, information, which is broadcasted by a first user equipment supporting the D2D function, of the first user equipment after determining that the cell to which the second user equipment currently belongs supports the D2D function according to the D2D capability information; performing, by the second user equipment, communication matching with the first user equipment according to the information of the first user equipment and the D2D capability information of the serving base station of the cell to which the second user equipment currently belongs.

17 Claims, 6 Drawing Sheets

Related U.S. Application Data continuation of application No. PCT/CN2012/084100, filed on Nov. 5, 2012.

(51) Int. Cl.
*H04W 36/00* (2009.01)
*H04W 8/24* (2009.01)

(56) References Cited

U.S. PATENT DOCUMENTS

2014/0057670 A1* 2/2014 Lim .................. H04W 8/005
455/509
2014/0211696 A1 7/2014 Chai et al.

FOREIGN PATENT DOCUMENTS

| WO | WO 2010082084 A1 | 7/2010 |
| WO | WO 2010102668 A1 | 9/2010 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.3.0, pp. 1-296, 3rd Generation Partnership Project, Valbonne, France (Sep. 2011).

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.3.0, pp. 1-254, 3rd Generation Partnership Project, Valbonne, France (Sep. 2011).

* cited by examiner

COMMUNICATION MATCHING METHOD, USER EQUIPMENT AND BASE STATION

CROSS-REFERENCE TO RELATED APPLICATIONS

This application is a continuation of U.S. patent application Ser. No. 14/266,320, filed on Apr. 30, 2014, which is a continuation of International Patent Application No. PCT/CN2012/084100, filed on Nov. 5, 2012, which claims priority to Chinese Patent Application No. 201110345913.3, filed on Nov. 4, 2011. The afore-mentioned patent applications are hereby incorporated by reference in their entireties.

TECHNICAL FIELD

Embodiments of the present invention relate to the field of communication technologies and, in particular, to a communication matching method, a user equipment and a base station.

BACKGROUND

Device to device (Device to Device, hereinafter abbreviated as: D2D) communication technology can implement services and data applications of local ad hoc (ad-hoc) network and short-distance communications.

In order to improve spectrum utilization, the D2D system and the cellular system share the same resources. When a D2D terminal in the D2D system accesses a cellular system, it should follow the time and time slots of the cellular system. The D2D system can support services such as information sharing, gaming, social network service and mobile advertising.

In the prior art, a D2D terminal in the D2D system uses its own sensing function, and autonomously performs communicate matching with other D2D terminals according to the sensing results. The process does not involve the control and assignation of evolved packet core (Evolved Packet Core; hereinafter abbreviated as: EPC)/evolved universal mobile telecommunications system terrestrial radio access network (Evolved Universal Mobile Telecommunications System Terrestrial Radio Access Network; hereinafter abbreviated as: E-UTRAN), and it does not involve authentication and authorization of the network service provider. In addition, the existing communication matching technology can not involve the capacity and topology of the base station. These factors may lead to failure and anomaly of the D2D process.

SUMMARY

Embodiments of the present invention provide a communication matching method, a user equipment and a base station, so as to realizing that the communication matching between user equipments supporting the D2D function is performed according to information of the user equipment and capability of the base station, so that the success rate of communication matching is improved.

An embodiment of the present invention provides a communication matching method, including:

obtaining, by a second user equipment supporting a device to device (D2D) function, D2D capability information of a serving base station of a cell to which the second user equipment currently belongs;

obtaining, by the second user equipment, information, which is broadcasted by a first user equipment supporting the D2D function, of the first user equipment after determining that the cell to which the second user equipment currently belongs supports the D2D function according to the D2D capability information;

performing, by the second user equipment, communication matching with the first user equipment according to the information of the first user equipment and the D2D capability information of the serving base station of the cell to which the second user equipment currently belongs.

An embodiment of the present invention further provides a communication matching method, including:

receiving, by a serving base station of a cell to which a second user equipment supporting a device to device, D2D, function currently belongs, a connection establishment message sent by the second user equipment, where the connection establishment message is sent to the serving base station of the cell to which the second user equipment currently belongs by the second user equipment after the second user equipment determines that communication matching with a first user equipment needs to be performed according to information of the first user equipment supporting the D2D function;

performing, by the serving base station of the cell to which the second user equipment currently belongs, the communication matching between the second user equipment and the first user equipment, according to the connection establishment message and type information of a D2D capability supported by the serving base station of the cell to which the second user equipment currently belongs.

An embodiment of the present invention further provides a user equipment, the user equipment is a second user equipment supporting a device to device (D2D) function, the user equipment includes: an obtaining module, a determining module, and a communication matching module;

where the obtaining module is configured to obtain D2D capability information of a serving base station of a cell to which the second user equipment currently belongs, and to obtain information, which is broadcasted by a first user equipment supporting the D2D function, of the first user equipment after the determining module determines that the cell to which the second user equipment currently belongs supports the D2D function according to the D2D information;

the determining module is configured to determine that the cell to which the second user equipment currently belongs supports the D2D function according to the D2D information that the obtaining module obtained;

the communication matching module is configured to perform communication matching with the first user equipment according to the information of the first user equipment obtained by the obtaining module and the D2D capability information of the serving base station of the cell to which the second user equipment currently belongs obtained by the obtaining module.

An embodiment of the present invention further provides a base station, the base station is a serving base station of a cell to which a second user equipment supporting a device to device (D2D) function currently belongs, the base station includes:

a receiving module, configured to receive a connection establishment message sent by the second user equipment, where the connection establishment message is sent to the serving base station of the cell to which the second user equipment currently belongs after the second user equipment determines that communication matching with a first user equipment needs to be performed according to information of the first user equipment supporting the D2D function;

a matching module, configured to perform the communication matching between the second user equipment and the first user equipment, according to the connection establishment message received by the receiving module and type information of a D2D capability supported by the serving base station of the cell to which the second user equipment currently belongs.

In embodiments of the present invention, the second user equipment performs communication matching with the first user equipment according to the D2D capability information of the serving base station of the cell to which the second user equipment currently belongs and the information of the first user equipment, therefore, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved.

BRIEF DESCRIPTION OF DRAWINGS

In order to illustrate the technical solutions in embodiments of the present invention or in the prior art more clearly, accompanying drawings needed in the embodiments or the prior art are illustrated briefly as follows. Apparently, the accompanying drawings in the following description are merely some embodiments of the present invention, and persons of ordinary skill in the art may still derive other drawings from these accompanying drawings without creative effort.

DESCRIPTION OF EMBODIMENTS

To make the objectives, technical solutions, and advantages of embodiments of the present invention clearer, the following clearly and comprehensively describes the technical solutions in embodiments of the present invention with reference to the accompanying drawings in embodiments of the present invention. Apparently, the described embodiments are merely a part rather than all embodiments of the present invention. All other embodiments obtained by persons of ordinary skill in the art based on embodiments of the present invention without creative effort shall fall within the protection scope of the present invention.

Figure 1:
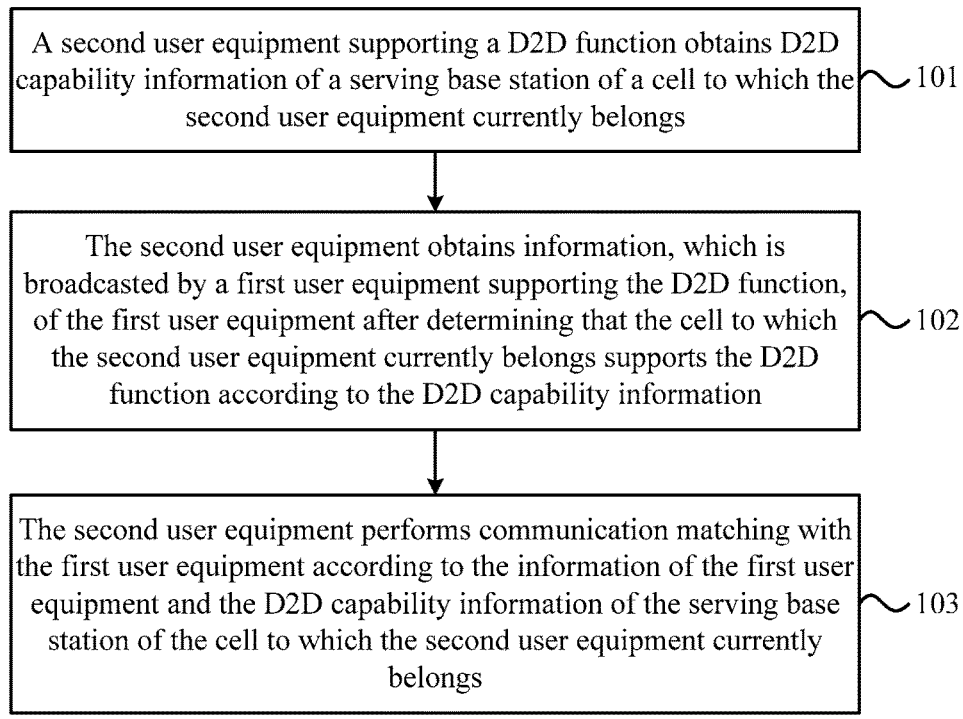
FIG. 1 is a schematic flowchart of a communication matching method according to an embodiment of the present invention.

FIG. 1 is a schematic flowchart of a communication matching method according to an embodiment of the present invention. As shown in FIG. 1, the communication matching method may include:

Step 101: A second user equipment supporting a D2D function obtains D2D capability information of a serving base station of a cell to which the second user equipment currently belongs.

Specifically, the second user equipment may receive a broadcast message sent by the serving base station of the cell to which the second user equipment currently belongs, the broadcast message carries the D2D capability information; or, in the process that the second user equipment establishes a radio resource control (Radio Resource Control, hereinafter abbreviated as RRC) connection with the serving base station of the cell to which the second user equipment currently belongs, the second user equipment receive a RRC connection message sent by the serving base station of the cell to which the second user equipment currently belongs, and the RRC connection message carries the D2D capability information.

Specifically, the D2D capability information is used for indicating whether the serving base station of the cell to which the second user equipment currently belongs supports the D2D function; when the D2D capability information indicates that the serving base station of the cell to which the second user equipment currently belongs supports the D2D function, the second user equipment may determine that the cell to which the second user equipment currently belongs supports the D2D function.

Step 102: The second user equipment obtains information, which is broadcasted by a first user equipment supporting the D2D function, of the first user equipment after determining that the cell to which the second user equipment currently belongs supports the D2D function according to the D2D capability information.

In this embodiment, the step of broadcasting, by the first user equipment supporting the D2D function, the information of the first user equipment may be that: the first user equipment obtains the D2D capability information of a serving base station of a cell to which the first user equipment currently belongs; the first user equipment obtains a resource for broadcasting the information of the first user equipment after determining that the cell to which the first user equipment currently belongs supports the D2D function according to the D2D capability information; the first user equipment broadcasts the information of the first user equipment on the obtained resource.

In this embodiment, the information of the first user equipment includes one of or a combination of: an identifier, a serving code and service information of application layer of the first user equipment; when the first user equipment is in demand of service, the information of the first user equipment further includes the demand information of the first user equipment.

Herein the identifier of the first user equipment includes one of or a combination of: an application layer identifier, a physical identifier, a non-access stratum identifier (Non- Access Stratum Identifier, hereinafter abbreviated as: NAS ID) and an access stratum identifier (Access Stratum Identifier, hereinafter abbreviated as: AS ID) of the first user equipment.

For example, the application layer identifier may be a user name of the first user equipment which is represented by one of or a combination of: a character string, a number, and a character; the physical identifier may be: a particular code sequence, such as international mobile sub scriber identification (International Mobile Sub scriber Identification, hereinafter abbreviated as: IMSI); the NAS ID may be a serving temporary mobile subscriber identifier (Serving Temporary Mobile Subscriber Identifier, hereinafter abbreviated as: s-TMSI) or a global unique temporary identifier(Global Unique Temporary Identifier, hereinafter abbreviated as: GUTI), if the first user equipment is in idle state, the old s-TMSI or GUTI stored at the last time may be used; if the first user equipment is in connection state, the current s-TMSI or GUTI may be used; the AS ID may be cell radio network temporary identifier (Cell Radio Network Temporary Identifier, hereinafter abbreviated as: C-RNTI) or D-RNTI (i.e., the radio network temporary identifier (Radio Network Temporary Identifier, hereinafter abbreviated as: RNTI) used for the D2D function);

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

Step 103: The second user equipment performs communication matching with the first user equipment according to the information of the first user equipment and the D2D capability information of the serving base station of the cell to which the second user equipment currently belongs.

In an implementation of the this embodiment, the information of the first user equipment further includes information of the serving cell and/or the serving base station of the first user equipment, where the information of the serving cell and/or the serving base station of the first user equipment includes information such as the identifier of the serving cell and/or the serving base station of the first user equipment, and the D2D capability information of the serving base station of the first user equipment. When the D2D capability information indicates that the serving base station of the cell to which the second user equipment currently belongs supports the D2D function, the D2D capability information further includes type information of the D2D capability supported by the serving base station of the cell to which the second user equipment currently belongs.

The type information of the D2D capability may include: the serving base station of the cell to which the second user equipment currently belongs supports a D2D communication function between the second user equipment and another user equipment, besides the second user equipment, which is in the cell to which the second user equipment currently belongs; or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs; or the serving base station of the cell to which the second user equipment currently belongs supports a D2D communication function between the second user equipment and another user equipment which is served by any other base station except the serving base station of the cell to which the second user equipment currently belongs; or the serving base station of the cell to which the second user equipment currently belongs supports a D2D communication function between the second user equipment and another user equipment which is served by one of limited base stations except the serving base station of the cell to which the second user equipment currently belongs; or the serving base station of the cell to which the second user equipment currently belongs supports a D2D communication function between the second user equipment and any user equipment which is in another radio access system except a radio access system to which the second user equipment belongs; where, the statement that the serving base station of the cell to which the second user equipment currently belongs supports a D2D communication function between the second user equipment and another user equipment which is served by one of limited base stations except the serving base station of the cell to which the second user equipment currently belongs, means that the serving base station of the cell to which the second user equipment currently belongs supports only the D2D connection between the second user equipment and another user equipment which is served by a base station in a range of at least one of limited base stations, except the serving base station of the cell to which the second user equipment currently belongs, when the serving base station of the cell to which the second user equipment currently belongs supports the D2D communication function between the second user equipment and another user equipment which is served by one of limited base stations except the serving base station of the cell to which the second user equipment currently belongs, the serving base station of the cell to which the second user equipment currently belongs needs to provide a list of base stations which can be possibly matched.

In this implementation, the second user equipment may determine whether the communication matching with the first user equipment needs to be performed according to the information of the first user equipment; if the second user equipment determines that the communication matching with the first user equipment needs to be performed, the second user equipment may determine that the communication matching with the first user equipment is successful, according to the information of the serving cell and/or the serving base station of the first user equipment, and the type information of the D2D capability supported by the serving base station of the cell to which the second user equipment currently belongs.

For example, assuming that the second user equipment needs to obtain information of a certain game, and the service information of application layer of the first user equipment which is broadcasted by the first user equipment includes the information of the game that the second user equipment needs to obtain, the second user equipment determines that the communication matching with the first user equipment needs to be performed; conversely, if the service information of application layer of the first user equipment which is broadcasted by the first user equipment does not include the information of the game that the second user equipment needs to obtain, the second user equipment determines that the communication matching with the first user equipment does not need to be performed. Of course, this is only an example of determining by the second user equipment whether the communication matching with the first user equipment needs to be performed, the present invention is not limited thereto, and the second user equipment may also determine whether the communication matching with the first user equipment needs to be performed according to other information in the information of the first user equipment, for example, the application layer identifier of the first user equipment, and the like, which will not be limited herein.

Then, if the D2D capability type information of the serving base station of the cell to which the second user equipment currently belongs is that the serving base station of the cell to which the second user equipment currently belongs supports a D2D communication function between the second user equipment and another user equipment, besides the second user equipment, which is in the cell to which the second user equipment currently belongs, or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs, while the serving base station of the first user equipment and the serving base station of the cell to which the second user equipment currently belongs are different, the second user equipment determines that the communication matching with the first user equipment fails; while the serving base station of the first user equipment is the same with the serving base station of the cell to which the second user equipment currently belongs, the second user equipment determines that the communication matching with the first user equipment succeeds.

In another implementation of this embodiment, the identifier of the first user equipment includes a physical identifier, and one of or a combination of an application layer identifier, a non-access stratum identifier and an access stratum identifier of the first user equipment, where the physical identifier may be scrambled by using the identifier of the serving cell and/or the serving base station of the first user equipment.

In this implementation, the second user equipment may perform descrambling to the physical identifier of the first user equipment in the information of the first user equipment, by using the identifier of the serving cell or the identifier of the serving base station of the second user equipment, or by using an identifier of a neighboring cell or a neighboring base station of the second user equipment, and then obtain the identifier of the serving cell and/or the serving base station of the first user equipment. Where, the identifier of the serving cell and/or the serving base station of the first user equipment may be: a character, a number or a character string, or a combination of these three, which can uniquely identify the serving cell and/or the serving base station of the first user equipment. The specific forms of the identifier of the serving cell and/or the serving base station of the first user equipment will not be limited by embodiments of the present invention. Then, the second user equipment may determine whether the first user equipment satisfies the communication matching condition, according to the identifier of the serving cell and/or the serving base station of the first user equipment, and the type information of the D2D capability supported by the serving base station of the cell to which the second user equipment currently belongs. If it is determined that the first user equipment satisfies the communication matching condition, the second user equipment determines whether the communication matching with the first user equipment needs to be performed according to the information of the first user equipment; if the second user equipment determines that the communication matching with the first user equipment needs to be performed, the second user equipment determines that the communication matching with the first user equipment is successful.

For example, if the D2D capability type information of the serving base station of the cell to which the second user equipment currently belongs is that the serving base station of the cell to which the second user equipment currently belongs supports a D2D communication function between the second user equipment and another user equipment, besides the second user equipment, which is in the cell to which the second user equipment currently belongs, or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs, while the serving base station of the first user equipment and the serving base station of the second user equipment are different, the second user equipment determines that the first user equipment does not satisfy the communication matching condition, and then determines that the communication matching with the first user equipment is failed; whereas, if the serving base station of the first user equipment and the serving base station of the second user equipment are the same, the second user equipment determines that the first user equipment satisfies the communication matching condition, and then determines whether the communication matching with the first user equipment needs to be performed. Assuming that the second user equipment needs to obtain information of a certain game, and the service information of application layer of the first user equipment which is broadcasted by the first user equipment includes the information of the game that the second user equipment needs to obtain, in this case, the second user equipment determines that the communication matching with the first user equipment needs to be performed and then determines that the communication matching with the first user equipment is successful.

It should be noted that, the base station in embodiments of the present invention may be an evolved NodeB (evolved NodeB, hereinafter abbreviated as eNB) and the like, the specific form of the base station is not to be limited in embodiments of the present invention, similarly hereinafter.

According to the above embodiment, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved.

Figure 2:
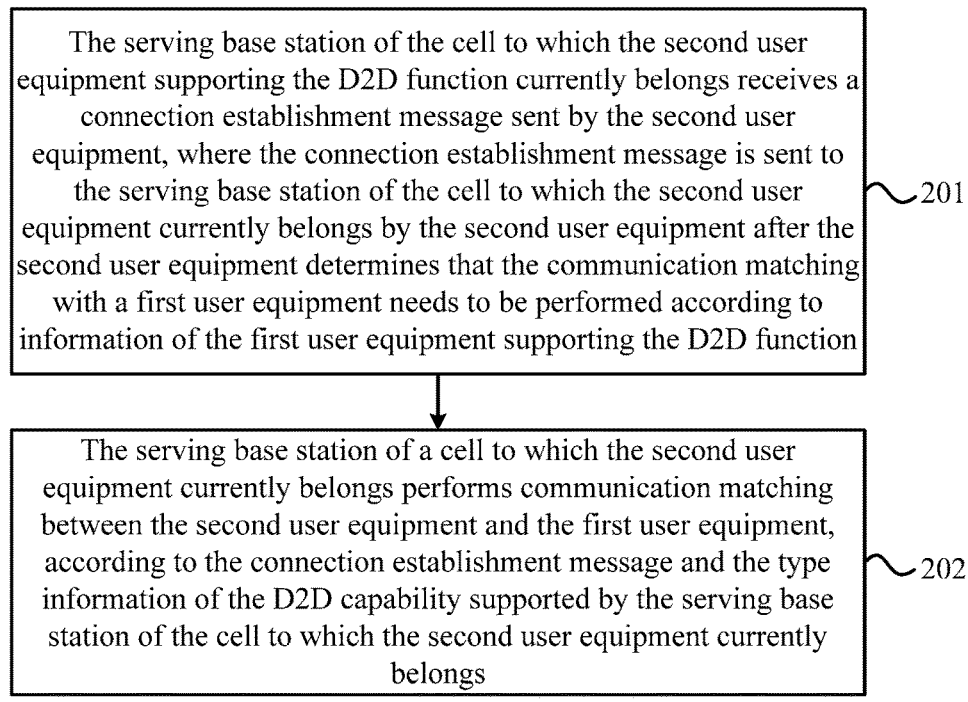
FIG. 2 is a schematic flowchart of a communication matching method according to another embodiment of the present invention.

FIG. 2 is a schematic flowchart of a communication matching method according to another embodiment of the present invention. As shown in FIG. 2, the communication matching method may include:

Step 201: The serving base station of the cell to which the second user equipment supporting the D2D function currently belongs receives a connection establishment message sent by the second user equipment, where the connection establishment message is sent to the serving base station of the cell to which the second user equipment currently belongs by the second user equipment after the second user equipment determines that the communication matching with a first user equipment needs to be performed according to information of the first user equipment supporting the D2D function.

In this embodiment, the information of the first user equipment includes one of or a combination of: an identifier, a serving code and service information of application layer of the first user equipment; when the first user equipment is in demand of service, the information of the first user equipment may further includes the demand information of the first user equipment.

Herein the identifier of the first user equipment includes one of or a combination of: an application layer identifier, a physical identifier, a NAS ID and an AS ID of the first user equipment.

For example, the application layer identifier may be a user name of the first user equipment which is represented by one of or a combination of: a character string, a number, and a character; physical identifier may be: a particular code sequence, such as IMSI; the NAS ID may be an s-TMSI or a GUTI, if the first user equipment is in idle state, the old s-TMSI or GUTI stored at the last time may be used; if the first user equipment is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

For example, assuming that the second user equipment needs to obtain information of a certain game, and the service information of application layer of the first user equipment which is broadcasted by the first user equipment includes the information of the game that the second user equipment needs to obtain, the second user equipment determines that the communication matching with the first user equipment needs to be performed.

Step 202: The serving base station of a cell to which the second user equipment currently belongs performs communication matching between the second user equipment and the first user equipment, according to the connection establishment message and the type information of the D2D capability supported by the serving base station of the cell to which the second user equipment currently belongs.

The type information of the D2D capability may include: the serving base station of the cell to which the second user equipment currently belongs supports a D2D communication function between the second user equipment and another user equipment, besides the second user equipment, which is in the cell to which the second user equipment currently belongs; or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs; or the serving base station of the cell to which the second user equipment currently belongs supports a D2D communication function between the second user equipment and another user equipment which is served by any other base station except the serving base station of the cell to which the second user equipment currently belongs; or the serving base station of the cell to which the second user equipment currently belongs supports a D2D communication function between the second user equipment and another user equipment which is served by one of limited base stations except the serving base station of the cell to which the second user equipment currently belongs; or the serving base station of the cell to which the second user equipment currently belongs supports a D2D communication function between the second user equipment and any user equipment which is in another radio access system except a radio access system to which the second user equipment belongs; where, the statement that the serving base station of the cell to which the second user equipment currently belongs supports a D2D communication function between the second user equipment and another user equipment which is served by one of limited base stations except the serving base station of the cell to which the second user equipment currently belongs, means that the serving base station of the cell to which the second user equipment currently belongs supports only the D2D connection between the second user equipment and a user equipment which is served by a base station in a range of at least one of limited base stations, except the serving base station of the cell to which the second user equipment currently belongs, when the serving base station of the cell to which the second user equipment currently belongs supports the D2D communication function between the second user equipment and another user equipment which is served by one of limited base stations except the serving base station of the cell to which the second user equipment currently belongs, the serving base station of the cell to which the second user equipment currently belongs needs to provide a list of base stations which can be possibly matched.

In an implementation of this embodiment, the information of the first user equipment may further include information of the serving cell and/or the serving base station of the first user equipment, where the information of the serving cell and/or the serving base station of the first user equipment includes information such as the identifier of the serving cell and/or the serving base station of the first user equipment, and the D2D capability information of the serving base station of the first user equipment. The above connection establishment message carries D2D establishment type information, the identifier of the second user equipment, the identifier of the first user equipment, and information of the serving cell and/or the serving base station of the first user equipment.

In this implementation, the serving base station of the cell to which the second user equipment currently belongs may determine that the communication matching with the first user equipment is successful according to the information of the serving cell and/or the serving base station of the first user equipment which is carried in the above connection establishment message and the type information of the D2D capability supported by the serving base station of the cell to which the second user equipment currently belongs.

For example, if the D2D capability type information of the serving base station of the cell to which the second user equipment currently belongs is that the serving base station of the cell to which the second user equipment currently belongs supports a D2D communication function between the second user equipment and another user equipment, besides the second user equipment, which is in the cell to which the second user equipment currently belongs, or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs, while the serving base station of the first user equipment and the serving base station of the second user equipment are different, the serving base station of the cell to which the second user equipment currently belongs may determine that the communication matching with the first user equipment is failed; whereas, if the serving base station of the first user equipment and the serving base station of the second user equipment are the same, the serving base station of the cell to which the second user equipment currently belongs may determine that the communication matching with the first user equipment is successful.

In another implementation of this embodiment, the above connection establishment message carries the D2D establishment type information, the identifier of the second user equipment, and the identifier of the first user equipment.

In this implementation, the serving base station of the cell to which the second user equipment currently belongs firstly searches the identifier of the first user equipment from a user equipment context stored in the base station itself.

If the identifier of the first user equipment is found, the serving base station of the cell to which the second user equipment currently belongs determines that the serving base station itself is the serving base station of the first user equipment, and determines that the communication matching between the second user equipment and the first user equipment is successful, according to the type information of the D2D capability supported by the serving base station of the cell to which the second user equipment currently belongs.

If the identifier of the first user equipment is not found in the user equipment context stored in the serving base station itself by the serving base station of the cell to which the second user equipment currently belongs, the serving base station of the cell to which the second user equipment currently belongs determines that the serving base station itself is not the serving base station of the first user equipment, and then queries to a core network device to obtain information of the serving base station of the first user equipment, where the information of the serving base station of the first user equipment includes information such as the identifier of the serving base station of the first user equipment and the D2D capability information of the serving base station of the first user equipment; then, the serving base station of the cell to which the second user equipment currently belongs determines that the communication matching between the second user equipment and the first user equipment is successful, according to the information of the serving base station of the first user equipment and the type information of the D2D capability supported by the serving base station of the cell to which the second user equipment currently belongs.

According to the above embodiment, the communication matching between the user equipments which support the D2D function can be performed according to the information of the user equipment and the capability of the base station, thereby avoiding the problems that the D2D communication matching procedure has failed or becomes abnormal because the base station does not support the D2D capability or the base station has limited capability of supporting D2D, thus the success rate of communication matching can be improved.

Figure 3:
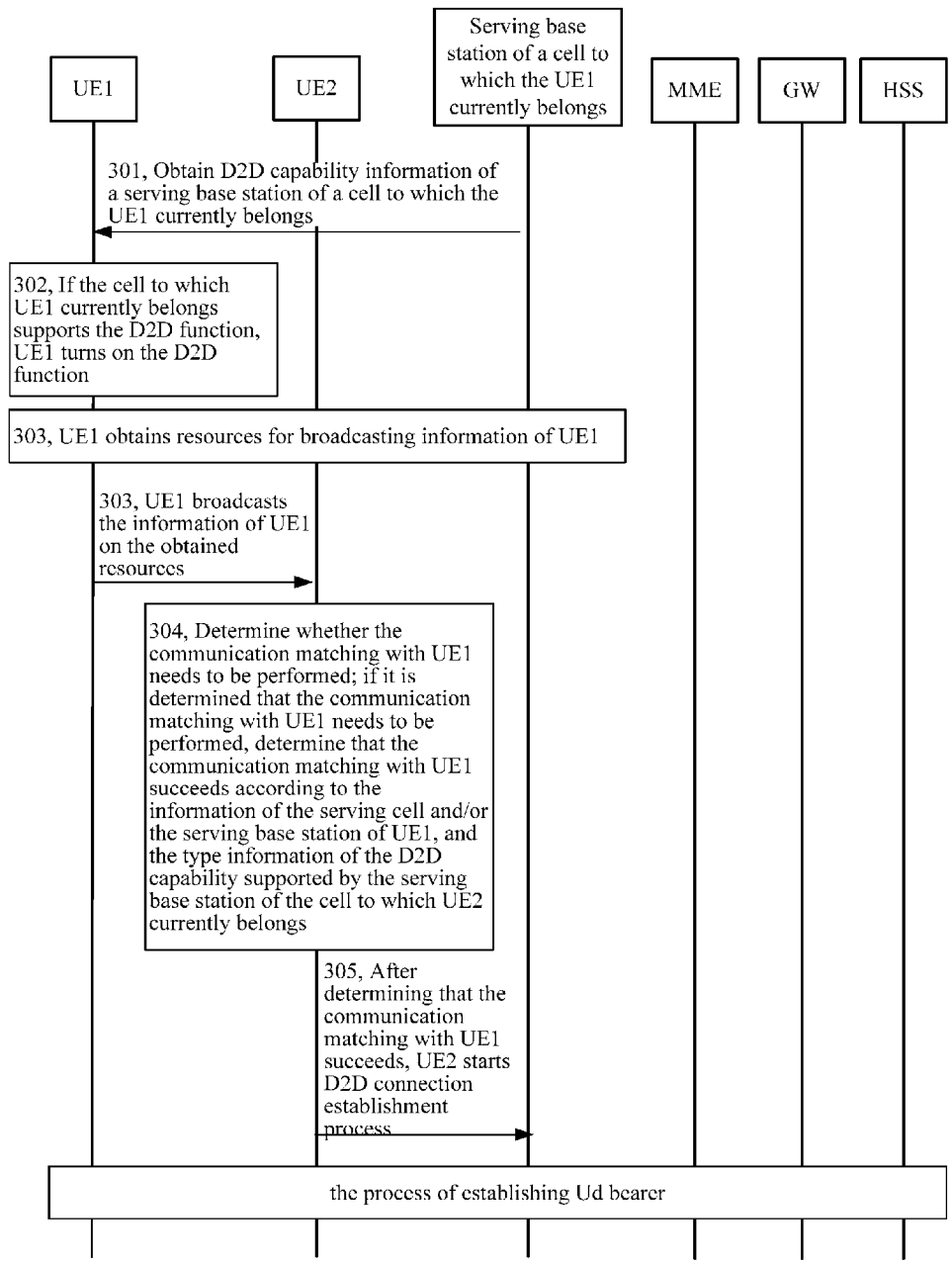
FIG. 3 is a schematic flowchart of a communication matching method according to another embodiment of the present invention.

FIG. 3 is a schematic flowchart of a communication matching method according to another embodiment of the present invention. As shown in FIG. 3, the communication matching method may include:

Step 301: UE1, which supports a D2D function, obtains D2D capability information of a serving base station of a cell to which the UE1 currently belongs.

The cell to which UE1 currently belongs includes the destination cell UE1 hand-over to, or the cell to which UE1 belongs when UE1 was switched on.

Specifically, UE1 may receive a broadcast message sent by the serving base station of the cell to which UE1 currently belongs, the broadcast message carries the D2D capability information; or, in the process that UE1 establishes a RRC connection with the serving base station of the cell to which UE1 currently belongs, UE1 receive a RRC connection message sent by the serving base station of the cell to which UE1 currently belongs, where the RRC connection message carries the D2D capability information.

In this embodiment, the D2D capability information is used for indicating whether the serving base station of the cell to which UE1 currently belongs supports the D2D function; if the D2D capability information indicates that the serving base station of the cell to which UE1 currently belongs supports the D2D function, UE1 may determine that the cell to which UE1 currently belongs supports the D2D function.

Furthermore, if the D2D capability information indicates that the serving base station of the cell to which UE1 currently belongs supports the D2D function, the D2D capability information may further include the type information of the D2D capability supported by the serving base station of the cell to which UE1 currently belongs. The type information of the D2D capability may be: the serving base station of the cell to which UE1 currently belongs supports a D2D communication function between UE1 and another UE, besides UE1, which is in the cell to which UE1 currently belongs; or the serving base station of the cell to which UE1 currently belongs supports a D2D communication function between UE1 and another UE which is in another cell, besides the cell to which UE1 currently belongs, served by the serving base station of the cell to which UE1 currently belongs; or the serving base station of the cell to which UE1 currently belongs supports a D2D communication function between UE1 and another UE which is served by any other base station except the serving base station of the cell to which UE1 currently belongs; or the serving base station of the cell to which UE1 currently belongs supports a D2D communication function between UE1 and another UE which is served by one of limited base stations except the serving base station of the cell to which UE1 currently belongs; or the serving base station of the cell to which UE1 currently belongs supports a D2D communication function between UE1 and any UE which is in another radio access system except a radio access system to which UE1 belongs; where, the statement that the serving base station of the cell to which UE1 currently belongs supports a D2D communication function between UE1 and another UE which is served by one of limited base stations except the serving base station of the cell to which UE1 currently belongs, means that the serving base station of the cell to which UE1 currently belongs supports only the D2D connection between UE1 and a UE which is served by a base station in a range of at least one of limited base stations, except the serving base station of the cell to which UE1 currently belongs, when the serving base station of the cell to which UE1 currently belongs supports the D2D communication function between UE1 and another UE which is served by one of limited base stations except the serving base station of the cell to which UE1 currently belongs, the serving base station of the cell to which UE1 currently belongs needs to provide a list of base stations which can be possibly matched.

Step 302: If the cell to which UE1 currently belongs supports the D2D function, UE1 turns on the D2D function, where the D2D function includes functions of obtaining resources for broadcasting information of UE1, broadcasting information of UE1, and communication matching, and so on.

In this embodiment, if the cell to which UE1 currently belongs does not support the D2D function, UE1 will not turn on the D2D function.

Step 303: UE1 obtains resources for broadcasting information of UE1, and broadcasts the information of UE1 on the obtained resources.

In this embodiment, the information of UE1 includes one of or a combination of: an identifier, a serving code and service information of application layer of UE1; when UE1 is in demand of service, the information of UE1 further includes the demand information of UE1.

Herein the identifier of UE1 includes one of or a combination of: an application layer identifier, a physical identifier, a NAS ID and an AS ID of UE1.

For example, the application layer identifier may be a user name of UE1 which is represented by one of or a combination of: a character string, a number, and a character; physical identifier may be: a particular code sequence, such as IMS; the NAS ID may be an s-TMSI or a GUTI, if the first user equipment is in idle state, the old s-TMSI or GUTI stored at the last time may be used; if the first user equipment is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

Furthermore, in this embodiment, the information of UE1 further includes information of the serving cell and/or the serving base station of UE1, herein the information of the serving cell and/or the serving base station of UE1 includes information such as the identifier of the serving cell and/or the serving base station of UE1, and the D2D capability information of the serving base station of UE1.

Step 304: UE2, which supports a D2D function, determines whether the communication matching with UE1 needs to be performed according to the information of UE1 that is broadcasted by the UE1, when UE2 learns through sensing technology or through searching and measuring other UE supporting the D2D function, that UE1 which can be possibly matched exists; if UE2 determines that the communication matching with UE1 needs to be performed, UE2 determines that the communication matching with UE1 succeeds according to the information of the serving cell and/or the serving base station of UE1, and the type information of the D2D capability supported by the serving base station of the cell to which UE2 currently belongs.

In this embodiment, before the step 304, similar with UE1, UE2 also performs the method described in the step 301 to the step 303 to obtain the D2D capability information of a serving base station of a cell to which UE2 currently belongs, turn on the D2D function and broadcast the information of UE2.

For example, assuming that UE2 needs to obtain information of a certain game, and the service information of application layer of UE1 which is broadcasted by UE1 includes the information of the game that UE2 needs to obtain, UE2 determines that the communication matching with UE1 needs to be performed; conversely, if the service information of application layer of UE1 which is broadcasted by UE1 does not include the information of the game that UE2 needs to obtain, UE2 determines that the communication matching with UE1 does not need to be performed. Of course, this is only an example of determining by UE2 whether the communication matching with UE1 needs to be performed, the present invention is not limited thereto, and UE2 may also determine whether the communication matching with UE1 needs to be performed according to other information in the information of UE1, for example, the application layer identifier of UE1, and the like, which will not be limited herein.

Then, if the D2D capability type information of the serving base station of the cell to which UE2 currently belongs is that the serving base station of the cell to which UE2 currently belongs supports a D2D communication function between UE2 and another UE, besides UE2, which is in the cell to which UE2 currently belongs, or the serving base station of the cell to which UE2 currently belongs supports a D2D communication function between UE2 and another UE which is in another cell, besides the cell to which UE2 currently belongs, served by the serving base station of the cell to which UE2 currently belongs, while the serving base station of UE1 and the serving base station of the cell to which UE2 currently belongs are different, UE2 determines that the communication matching with UE1 fails; while the serving base station of UE1 is the same with the serving base station of the cell to which UE2 currently belongs, UE2 determines that the communication matching with UE1 succeeds.

Step 305: After determining that the communication matching with UE1 succeeds, UE2 starts a D2D connection establishment process.

Then, UE1, UE2, the serving base station of a cell to which UE1 currently belongs, the serving base station of a cell to which UE2 currently belongs (not shown in FIG. 3), mobility management entity (Mobility Management Entity, hereinafter abbreviated as: MME), gateway (Gateway, hereinafter abbreviated as: GW) and home subscriber server (Home Subscriber Server, hereinafter abbreviated as: HSS) interact to complete the process of establishing Ud bearer.

According to the above embodiment, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved.

Figure 4:
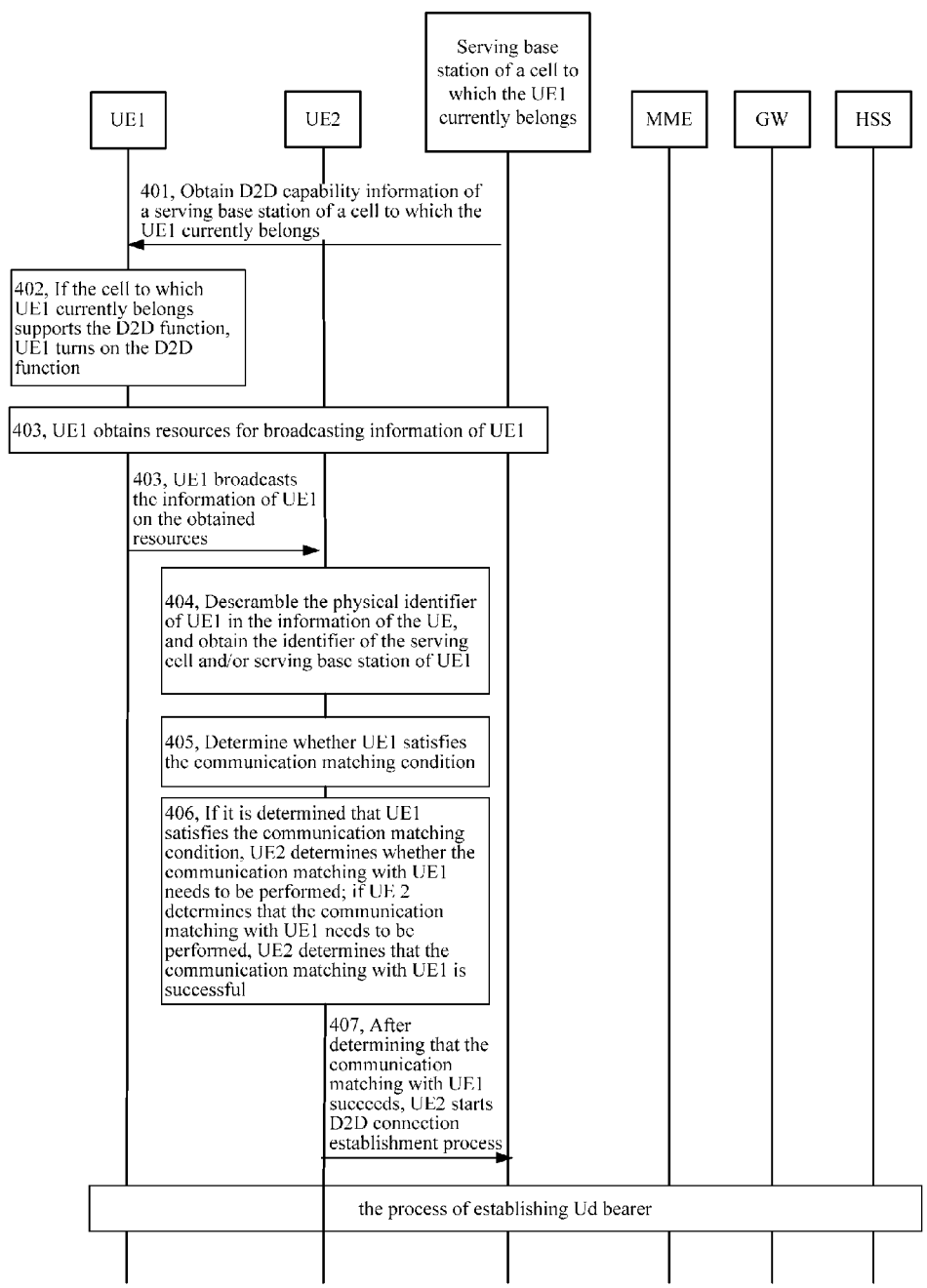
FIG. 4 is a schematic flowchart of a communication matching method according to another embodiment of the present invention.

FIG. 4 is a schematic flowchart of a communication matching method according to another embodiment of the present invention. As shown in FIG. 4, the communication matching method may include:

Step 401: UE1, which supports a D2D function, obtains D2D capability information of a serving base station of a cell to which UE1 currently belongs.

The cell to which UE1 currently belongs includes the destination cell UE1 hand-over to, or the cell to which UE1 belongs when UE1 was switched on.

Specifically, UE1 may receive a broadcast message sent by the serving base station of the cell to which UE1 currently belongs, the broadcast message carries the D2D capability information; or, in the process that UE1 establishes a RRC connection with the serving base station of the cell to which UE1 currently belongs, UE1 receive a RRC connection message sent by the serving base station of the cell to which UE1 currently belongs, where the RRC connection message carries the D2D capability information.

In this embodiment, the D2D capability information is used for indicating whether the serving base station of the cell to which UE1 currently belongs supports the D2D function; if the D2D capability information indicates that the serving base station of the cell to which UE1 currently belongs supports the D2D function, UE1 may determine that the cell to which UE1 currently belongs supports the D2D function.

Furthermore, if the D2D capability information indicates that the serving base station of the cell to which UE1 currently belongs supports the D2D function, the D2D capability information may further include the type information of the D2D capability supported by the serving base station of the cell to which UE1 currently belongs. The type information of the D2D capability may be: the serving base station of the cell to which UE1 currently belongs supports a D2D communication function between UE1 and another UE, besides UE1, which is in the cell to which UE1 currently belongs; or the serving base station of the cell to which UE1 currently belongs supports a D2D communication function between UE1 and another UE which is in another cell, besides the cell to which UE1 currently belongs, served by the serving base station of the cell to which UE1 currently belongs; or the serving base station of the cell to which UE1 currently belongs supports a D2D communication function between UE1 and another UE which is served by any other base station except the serving base station of the cell to which UE1 currently belongs; or the serving base station of the cell to which UE1 currently belongs supports a D2D communication function between UE1 and another UE which is served by one of limited base stations except the serving base station of the cell to which UE1 currently belongs; or the serving base station of the cell to which UE1 currently belongs supports a D2D communication function between UE1 and any UE which is in another radio access system except a radio access system to which UE1 belongs; where, the statement that the serving base station of the cell to which UE1 currently belongs supports a D2D communication function between UE1 and another UE which is served by one of limited base stations except the serving base station of the cell to which UE1 currently belongs, means that the serving base station of the cell to which UE1 currently belongs supports only the D2D connection between UE1 and a UE which is served by a base station in a range of at least one of limited base stations, except the serving base station of the cell to which UE1 currently belongs, when the serving base station of the cell to which UE1 currently belongs supports the D2D communication function between UE1 and another UE which is served by one of limited base stations except the serving base station of the cell to which UE1 currently belongs, the serving base station of the cell to which UE1 currently belongs needs to provide a list of base stations which can be possibly matched.

Step 402: If the cell to which UE1 currently belongs supports the D2D function, UE1 turns on the D2D function, where the D2D function includes functions of obtaining resources for broadcasting information of UE1, broadcasting information of UE1, and communication matching, and so on.

In this embodiment, if the cell to which UE1 currently belongs does not support the D2D function, UE1 will not turn on the D2D function.

Step 403: UE1 obtains resources for broadcasting information of UE1, and broadcasts the information of UE1 on the obtained resources.

In this embodiment, the information of UE1 includes one of or a combination of: an identifier, a serving code and service information of application layer of UE1; when UE1 is in demand of service, the information of UE1 further includes the demand information of UE1.

Herein the identifier of UE1 includes the physical identifier and one of or a combination of: an application layer identifier, a NAS ID and an AS ID of UE1.

For example, the application layer identifier may be a user name of UE1 which is represented by one of or a combination of: a character string, a number, and a character; physical identifier may be: a particular code sequence, such as IMS; the NAS ID may be an s-TMSI or a GUTI, if the first user equipment is in idle state, the old s-TMSI or GUTI stored at the last time may be used; if the first user equipment is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

Step 404: UE2, which supports a D2D function, learns through sensing technology or through searching and measuring other D2D function supported UE, that UE1 which can be possibly matched exists, and obtains the identifier of the serving cell and/or the serving base station of UE1 by descrambling the physical identifier of UE1 in the information of the UE by using the identifier of the serving cell or the serving base station, or by using the identifier of the neighboring cell or the neighboring base station of UE2.

In this embodiment, the identifier of the serving cell and/or the serving base station of UE1 include: a character, a number or a character string, or a combination of these three, which can uniquely identify the serving cell and/or the serving base station of UE1. The specific forms of the identifier of the serving cell and/or the serving base station of UE1 will not be limited by embodiments of the present invention.

Step 405: UE2 determines whether UE1 satisfies the communication matching condition, according to the identifier of the serving cell and/or the serving base station of UE1 and the type information of the D2D capability supported by the serving base station of the cell to which UE2 currently belongs.

In this embodiment, before the step 404, similar with UE1, UE2 also performs the method described in the step 401 to the step 403 to obtain the D2D capability information of a serving base station of a cell to which UE2 currently belongs, turn on the D2D function and broadcast the information of UE2.

For example, if the D2D capability type information of the serving base station of the cell to which UE2 currently belongs is that the serving base station of the cell to which UE2 currently belongs supports a D2D communication function between UE2 and another UE, besides UE2, which is in the cell to which UE2 currently belongs, or the serving base station of the cell to which UE2 currently belongs supports a D2D communication function between UE2 and another UE which is in another cell, besides the cell to which UE2 currently belongs, served by the serving base station of the cell to which UE2 currently belongs, while the serving base station of UE1 and the serving base station of UE2 are different, UE2 determines that UE1 does not satisfy the communication matching condition, and then determines that the communication matching with UE1 is failed; whereas, if the serving base station of UE1 and the serving base station of UE2 are the same, UE2 determines that UE1 satisfies the communication matching condition.

Step 406: If it is determined that UE1 satisfies the communication matching condition, UE2 determines whether the communication matching with UE1 needs to be performed according to the information of UE1; if UE 2 determines that the communication matching with UE1 needs to be performed, UE2 determines that the communication matching with UE1 is successful.

For example, assuming that UE2 needs to obtain information of a certain game, and the service information of application layer of UE1 which is broadcasted by UE1 includes the information of the game that UE2 needs to obtain, in this case, UE2 determines that the communication matching with UE1 needs to be performed and then determines that the communication matching with UE1 is successful. Of course this is only an example of determining by UE2 whether the communication matching with UE1 needs to be performed, the present invention is not limited thereto, and UE2 may also determine whether the communication matching with UE1 needs to be performed according to other information in the information of UE1, for example, the application layer identifier of UE1, and the like, which will not be limited herein.

Step 407: After determining that the communication matching with UE1 succeeds, UE2 starts a D2D connection establishment process.

Then, UE1, UE2, the serving base station of a cell to which the UE1 currently belongs, the serving base station of a cell to which the UE2 currently belongs (not shown in FIG. 4), MME, GW and HSS interact to complete the process of establishing Ud bearer.

According to the above embodiment, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved.

Figure 5:
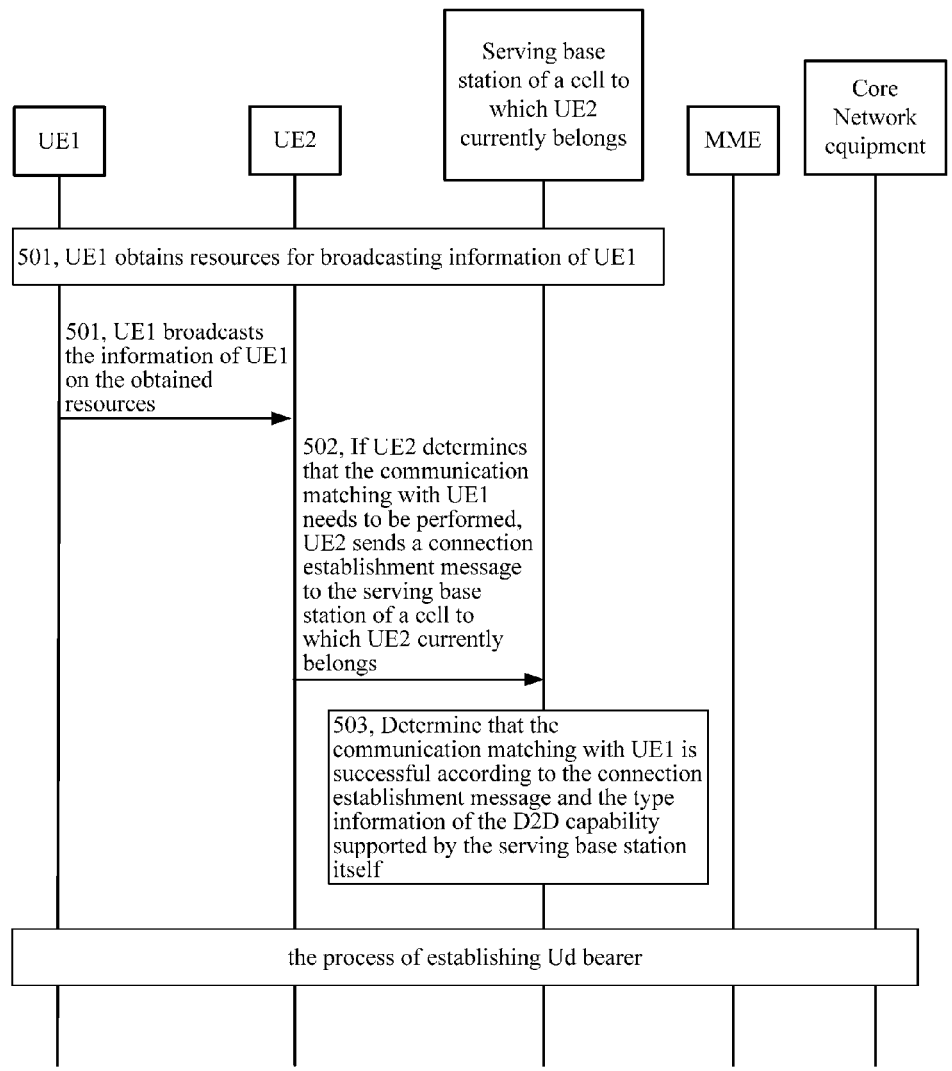
FIG. 5 is a schematic flowchart of a communication matching method according to another embodiment of the present invention.

FIG. 5 is a schematic flowchart of a communication matching method according to another embodiment of the present invention. As shown in FIG. 5, the communication matching method may include:

Step 501: UE1, which supports a D2D function, obtains resources for broadcasting information of UE1 at the cell to which UE1 currently belongs, and broadcasts information of UE1 on the obtained resources.

The cell to which UE1 currently belongs includes the destination cell UE1 hand-over to, or the cell to which UE1 belongs when UE1 was switched on.

In this embodiment, the information of UE1 includes one of or a combination of: an identifier, a serving code and service information of application layer of UE1; when UE1 is in demand of service, the information of UE1 further includes the demand information of UE1.

Herein the identifier of UE1 includes one of or a combination of: an application layer identifier, a physical identifier, a NAS ID and an AS ID of UE1.

For example, the application layer identifier may be a user name of UE1 which is represented by one of or a combination of: a character string, a number, and a character; physical identifier may be: a particular code sequence, such as IMS; the NAS ID may be an s-TMSI or a GUTI, if UE1 is in idle state, the old s-TMSI or GUTI stored at the last time may be used; if UE1 is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

Furthermore, in this embodiment, the information of UE1 may further include information of the serving cell and/or the serving base station of UE1, herein the information of the serving cell and/or the serving base station of UE1 includes information such as the identifier of the serving cell and/or the serving base station of UE1, and the D2D capability information of the serving base station of UE1.

Similarly, UE2, which supports a D2D function, also performs the same operations with UE1, including obtaining resources for broadcasting information of UE2 at the cell to which UE2 currently belongs, and broadcasts information of UE2 on the obtained resources. The information of UE2 includes the same content with that included in the information of UE1, which will not be repeated herein.

Step 502: When UE2 learns, through sensing technology or through searching and measuring other UE supporting the D2D function, that UE1 which can be possibly matched exists, UE2 determines whether the communication matching with UE1 needs to be performed according to the information of UE1 that is broadcast by the UE1, if UE2 determines that the communication matching with UE1 needs to be performed, UE2 sends a connection establishment message to the serving base station of a cell to which UE2 currently belongs, the connection establishment message carries D2D establishment type information, the identifier of UE2, the identifier of UE1, and information of the serving cell and/or the serving base station of UE1.

For example, assuming that UE2 needs to obtain information of a certain game, and if the service information of application layer of UE1 which is broadcasted by UE1 includes the information of the game that UE2 needs to obtain, UE2 determines that the communication matching with UE1 needs to be performed; conversely, if the service information of application layer of UE1 which is broadcasted by UE1 does not include the information of the game that UE2 needs to obtain, UE2 determines that the communication matching with UE1 does not need to be performed.

In this embodiment, if it is determined that the communication matching with UE1 does not need to be performed, UE2 determines not to start the D2D connection establishment process; in converse, if it is determined that the communication matching with UE1 needs to be performed, UE2 determines to start D2D connection establishment process, that is, to send a connection establishment message to the serving base station of a cell to which UE2 currently belongs.

Step 503: The serving base station of a cell to which UE2 currently belongs determines that the communication matching with UE1 is successful according to the connection establishment message and the type information of the D2D capability supported by the serving base station itself.

The type information of the D2D capability may be: the serving base station of the cell to which UE2 currently belongs supports a D2D communication function between UE2 and another UE, besides UE2, which is in the cell to which UE2 currently belongs; or the serving base station of the cell to which UE2 currently belongs supports a D2D communication function between UE2 and another UE which is in another cell, besides the cell to which UE2 currently belongs, served by the serving base station of the cell to which UE2 currently belongs; or the serving base station of the cell to which UE2 currently belongs supports a D2D communication function between UE2 and another UE which is served by any other base station except the serving base station of the cell to which UE2 currently belongs; or the serving base station of the cell to which UE2 currently belongs supports a D2D communication function between UE2 and another UE which is served by one of limited base stations except the serving base station of the cell to which UE2 currently belongs; or the serving base station of the cell to which UE2 currently belongs supports a D2D communication function between UE2 and any UE which is in another radio access system except a radio access system to which UE2 belongs; where, the statement that the serving base station of the cell to which UE2 currently belongs supports a D2D communication function between UE2 and another UE which is served by one of limited base stations except the serving base station of the cell to which UE2 currently belongs, means that the serving base station of the cell to which UE2 currently belongs supports only the D2D connection between UE2 and a UE which is served by a base station in a range of at least one of limited base stations, except the serving base station of the cell to which UE2 currently belongs, when the serving base station of the cell to which UE2 currently belongs supports the D2D communication function between UE2 and another UE which is served by one of limited base stations except the serving base station of the cell to which UE2 currently belongs, the serving base station of the cell to which UE2 currently belongs needs to provide a list of base stations which can be possibly matched.

For example, if the D2D capability type information of the serving base station of the cell to which UE2 currently belongs is that the serving base station of the cell to which UE2 currently belongs supports a D2D communication function between UE2 and another UE, besides UE2, which is in the cell to which UE2 currently belongs, or the serving base station of the cell to which UE2 currently belongs supports a D2D communication function between UE2 and another UE which is in another cell, besides the cell to which UE2 currently belongs, served by the serving base station of the cell to which UE2 currently belongs, while the serving base station of UE1 and the serving base station of the cell to which UE2 currently belongs are different, UE2 determines that the communication matching with UE1 fails; while the serving base station of UE1 is the same with the serving base station of the cell to which UE2 currently belongs, UE2 determines that the communication matching with UE1 succeeds.

Furthermore, after determining that the communication matching with UE1 succeeds, the D2D connection establishment process continues. UE1, UE2, the serving base station to which UE2 currently belongs, MME, and core network equipment interact to complete the process of establishing Ud bearer.

According to the above embodiment, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved.

Figure 6:
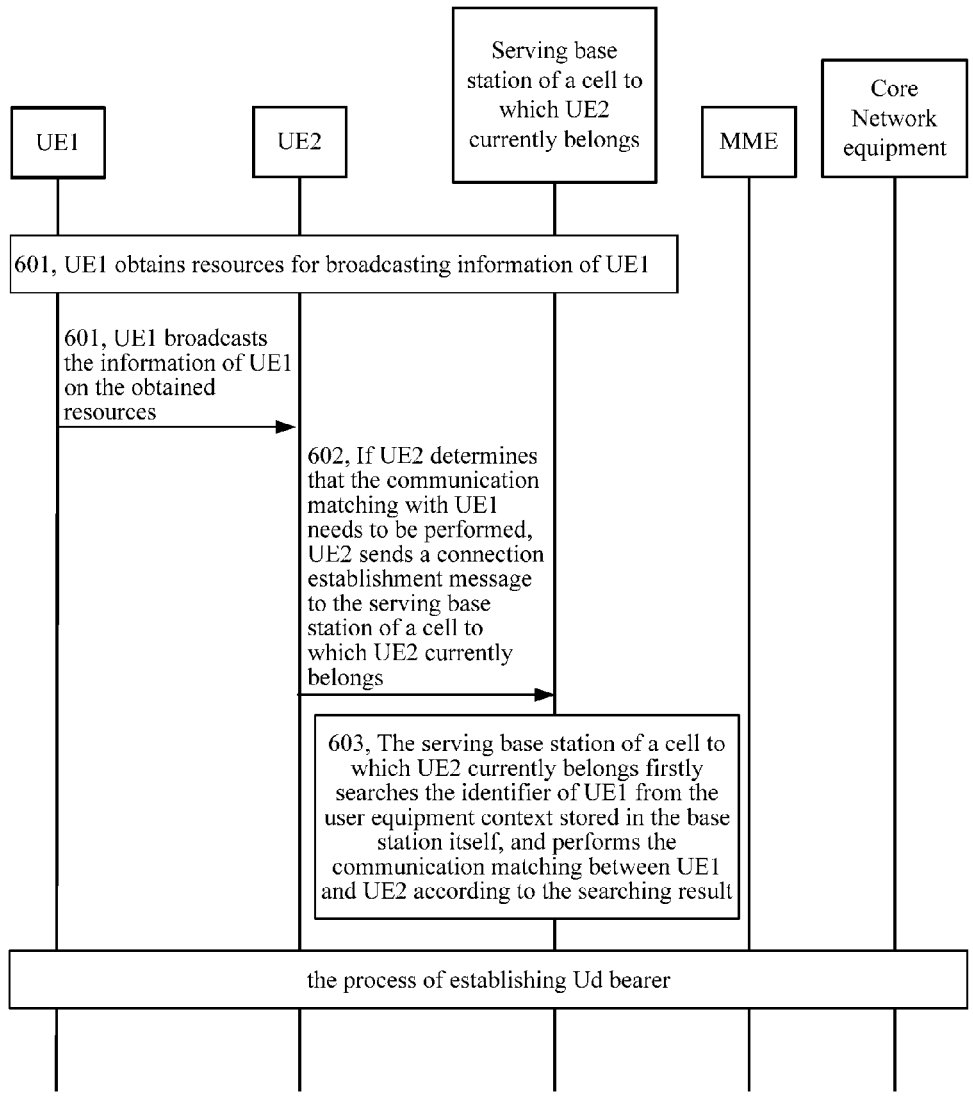
FIG. 6 is a schematic flowchart of a communication matching method according to another embodiment of the present invention.

FIG. 6 is a schematic flowchart of a communication matching method according to another embodiment of the present invention. As shown in FIG. 6, the communication matching method may include:

Step 601: UE1, which supports a D2D function, obtains resources for broadcasting information of UE1 at the cell to which UE1 currently belongs, and broadcasts information of UE1 on the obtained resources.

The cell to which UE1 currently belongs includes the destination cell UE1 hand-over to, or the cell to which UE1 belongs when UE1 was switched on.

In this embodiment, the information of UE1 includes one of or a combination of: an identifier, a serving code and service information of application layer of UE1; when UE1 is in demand of service, the information of UE1 further includes the demand information of UE1.

Herein the identifier of UE1 includes one of or a combination of: an application layer identifier, a physical identifier, a NAS ID and an AS ID of UE1.

For example, the application layer identifier may be a user name of UE1 which is represented by one of or a combination of: a character string, a number, and a character; physical identifier may be: a particular code sequence, such as IMS; the NAS ID may be an s-TMSI or a GUTI, if UE1 is in idle state, the old s-TMSI or GUTI stored at the last time may be used; if UE1 is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

Similarly, UE2, which supports a D2D function, also performs the same operations with UE1, including obtaining resources for broadcasting information of UE2 at the cell to which UE2 currently belongs, and broadcasts information of UE2 on the obtained resources. The information of UE2 includes the same content with that included in the information of UE1, which will not be repeated herein.

Step 602: When UE2 learns, through sensing technology or through searching and measuring other UE supporting the D2D function, that UE1 which can be possibly matched exists, UE2 determines whether the communication matching with UE1 needs to be performed according to the information of UE1 that is broadcast by the UE1, if UE2 determines that the communication matching with UE1 needs to be performed, UE2 sends a connection establishment message to the serving base station of a cell to which UE2 currently belongs, the connection establishment message carries D2D establishment type information, the identifier of UE2 and the identifier of UE1.

For example, assuming that UE2 needs to obtain information of a certain game, and if the service information of application layer of UE1 which is broadcasted by UE1 includes the information of the game that UE2 needs to obtain, UE2 determines that the communication matching with UE1 needs to be performed; conversely, if the service information of application layer of UE1 which is broadcasted by UE1 does not include the information of the game that UE2 needs to obtain, UE2 determines that the communication matching with UE1 does not need to be performed. Of course this is only an example of determining by UE2 whether the communication matching with UE1 needs to be performed, the present invention is not limited thereto, and UE2 may also determine whether the communication matching with UE1 needs to be performed according to other information of the information of UE1, for example, the application layer identifier of UE1, and the like, which will not be limited herein.

In this embodiment, if it is determined that the communication matching with UE1 does not need to be performed, UE2 determines not to start the D2D connection establishment process; in converse, if it is determined that the communication matching with UE1 needs to be performed, UE2 determines to start D2D connection establishment process, that is, to send a connection establishment message to the serving base station of a cell to which UE2 currently belongs.

Step 603: The serving base station of a cell to which UE2 currently belongs firstly searches the identifier of UE1 from the user equipment context stored in the base station itself, and performs the communication matching between UE1 and UE2 according to the searching result.

Specifically, if the serving base station of the cell to which UE2 currently belongs finds the identifier of UE1 in the user equipment context stored in the base station itself, the serving base station of the cell to which UE2 currently belongs determines that the serving base station itself is the serving base station of UE1, and determines that the communication matching between UE1 and UE2 is successful, according to the type information of the D2D capability supported by the serving base station itself.

If the serving base station of the cell to which UE2 currently belongs does not find the identifier of UE1 in the user equipment context stored in the base station itself, the serving base station of the cell to which UE2 currently belongs determines that the serving base station itself is not the serving base station of UE1, and then the serving base station of the cell to which UE2 currently belongs queries to a core network device (such as a UE location data server) to obtain information of the serving base station of UE1, herein the information of the serving base station of UE1 includes the identifier of the serving base station of UE1 and the D2D capability information of the serving base station of UE1; then the serving base station of the cell to which UE2 currently belongs determines that the communication matching between the second user equipment and UE1 is successful, according to the information of the serving base station of UE1 and the type information of the D2D capability supported by the serving base station of the cell to which UE2 currently belongs.

For example, if the D2D capability type information of the serving base station of the cell to which UE2 currently belongs is that the serving base station of the cell to which UE2 currently belongs supports a D2D communication function between UE2 and another UE, besides UE2, which is in the cell to which UE2 currently belongs, or the serving base station of the cell to which UE2 currently belongs supports a D2D communication function between UE2 and another UE which is in another cell, besides the cell to which UE2 currently belongs, served by the serving base station of the cell to which UE2 currently belongs, while the serving base station of UE1 and the serving base station of the cell to which UE2 currently belongs are different, UE2 determines that UE1 does not satisfy the communication matching condition, and then determines that the communication matching between UE1 and UE2 fails; while the serving base station of UE1 is the same with the serving base station of the cell to which UE2 currently belongs, UE2 determines that UE1 satisfies the communication matching condition, and then determines that the communication matching between UE1 and UE2 succeeds.

In addition, after determining that the communication matching with UE1 succeeds, the D2D connection establishment process continues. UE1, UE2, the serving base station of the cell to which UE2 currently belongs, MME, and core network equipment interact to complete the process of establishing Ud bearer.

According to the above embodiment, the communication matching between the user equipments which support the D2D function can be performed according to the information of the user equipment and the capability of the base station, thereby avoiding the problems that the D2D communication matching procedure fails or becomes abnormal because the base station does not support the D2D capability or the base station has limited capability of supporting D2D, thus the success rate of communication matching can be improved Persons of ordinary skill in the art may understand that all or a part of the steps of the methods according to embodiments of the present invention may be implemented by a program instructing relevant hardware. The program may be stored in a computer readable storage medium. When the program runs, the steps of the methods according to the embodiments are performed. The storage medium may be any medium that is capable of storing program codes, such as a ROM, a RAM, a magnetic disk, or an optical disk.

Figure 7:
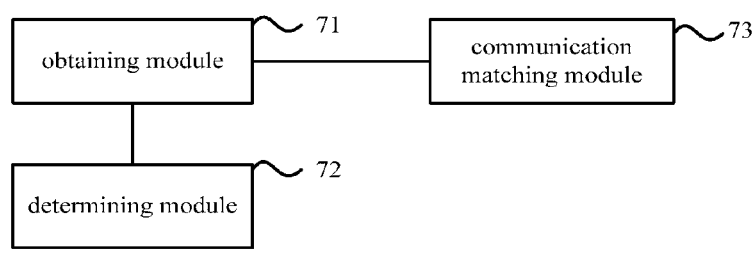
FIG. 7 is a schematic structural diagram of a user equipment according to an embodiment of the present invention.

FIG. 7 is a schematic structural diagram of a user equipment according to an embodiment of the present invention, the user equipment in this embodiment is the second user equipment which supports the D2D function, and can implement the process according to the embodiment of the present invention as shown in FIG. 1. Referring to FIG. 7, the user equipment may include: an obtaining module 71, a determining module 72, and a communication matching module 73.

The obtaining module 71 is configured to obtain D2D capability information of a serving base station of a cell to which the second user equipment currently belongs, and to obtain information, which is broadcasted by a first user equipment supporting the D2D function, of the first user equipment after the determining module 72 determines that the cell to which the second user equipment currently belongs supports the D2D function according to the D2D information. Specifically, the obtaining module 71 may receive a broadcast message sent by the serving base station of the cell to which the second user equipment currently belongs, where the broadcast message carries the D2D capability information; or receive a radio resource control connection message sent by the serving base station of the cell to which the second user equipment currently belongs, in a process of establishing an RRC connection between the second user equipment and the serving base station of the cell to which the second user equipment currently belongs, where the RRC connection message carries the D2D capability information.

The determining module 72 is configured to determine that the cell to which the second user equipment currently belongs supports the D2D function according to the D2D information that the obtaining module 71 obtained. Specifically, the determining module 72 may determine that the cell to which the second user equipment currently belongs supports the D2D function when the D2D capability information indicates that the serving base station of the cell to which the second user equipment currently belongs supports the D2D function.

The communication matching module 73 is configured to perform communication matching with the first user equipment according to the information of the first user equipment obtained by the obtaining module 71 and the D2D capability information of the serving base station of the cell to which the second user equipment currently belongs obtained by the obtaining module 71.

In this embodiment, the D2D capability information is used for indicating whether the serving base station of the cell to which the second user equipment currently belongs supports the D2D function; if the D2D capability information indicates that the serving base station of the cell to which the second user equipment currently belongs supports the D2D function, the D2D capability information further includes the type information of the D2D capability supported by the serving base station of the cell to which the second user equipment currently belongs.

The type information of the D2D capability may include: the serving base station of the cell to which the second user equipment currently belongs supports a D2D communication function between the second user equipment and another user equipment, besides the second user equipment, which is in the cell to which the second user equipment currently belongs; or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs; or the serving base station of the cell to which the second user equipment currently belongs supports a D2D communication function between the second user equipment and another user equipment which is served by any other base station except the serving base station of the cell to which the second user equipment currently belongs; or the serving base station of the cell to which the second user equipment currently belongs supports a D2D communication function between the second user equipment and another user equipment which is served by one of limited base stations except the serving base station of the cell to which the second user equipment currently belongs; or the serving base station of the cell to which the second user equipment currently belongs supports a D2D communication function between the second user equipment and any user equipment which is in another radio access system except a radio access system to which the second user equipment belongs; where, the statement that the serving base station of the cell to which the second user equipment currently belongs supports a D2D communication function between the second user equipment and another user equipment which is served by one of limited base stations except the serving base station of the cell to which the second user equipment currently belongs, means that the serving base station of the cell to which the second user equipment currently belongs supports only the D2D connection between the second user equipment and a user equipment which is served by a base station in a range of at least one of limited base stations, except the serving base station of the cell to which the second user equipment currently belongs, when the serving base station of the cell to which the second user equipment currently belongs supports the D2D communication function between the second user equipment and another user equipment which is served by one of limited base stations except the serving base station of the cell to which the second user equipment currently belongs, the serving base station of the cell to which the second user equipment currently belongs needs to provide a list of base stations which can be possibly matched.

According to the above user equipment, the communication matching between the user equipments which support the D2D function can be performed according to the information of the user equipment and the capability of the base station, thereby avoiding the problems that the D2D communication matching procedure has failed or becomes abnormal because the base station does not support the D2D capability or the base station has limited capability of supporting D2D, thus the success rate of communication matching can be improved.

Figure 8:
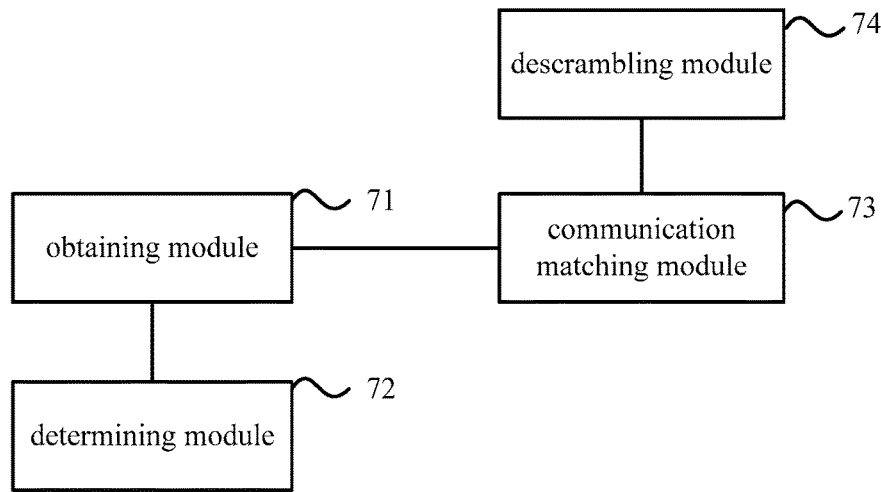
FIG. 8 is a schematic structural diagram of a user equipment according to another embodiment of the present invention.

FIG. 8 is a schematic structural diagram of a user equipment according to another embodiment of the present invention, comparing to the user equipment shown in FIG. 7, the difference is that, in an implementation of this embodiment, the communication matching module 73 may determine whether the communication matching with the first user equipment needs to be performed according to the information of the first user equipment; if it is determined that the communication matching with the first user equipment needs to be performed, the communication matching module 73 determines that the communication matching with the first user equipment is successful, according to the information of the serving cell and/or the serving base station of the first user equipment, and the type information of the D2D capability supported by the serving base station of the cell to which the second user equipment currently belongs.

In another implementation of this embodiment, the user equipment shown in FIG. 8 may further include:

a descrambling module 74, configured to perform descrambling to the physical identifier of the first user equipment in the information of the first user equipment, by using the identifier of the serving cell or the identifier of the serving base station of the second user equipment, or by using an identifier of a neighboring cell or a neighboring base station of the second user equipment, and then obtain the identifier of the serving cell and/or the serving base station of the first user equipment.

In this case, the communication matching module 73 may determine whether the first user equipment satisfies a communication matching condition, according to the identifier of the serving cell and/or the serving base station of the first user equipment, and the type information of the D2D capability supported by the serving base station of the cell to which the second user equipment currently belongs; and determine whether the communication matching with the first user equipment needs to be performed according to the information of the first user equipment if it is determined that the first user equipment satisfies the communication matching condition; and determine that the communication matching with the first user equipment is successful if it is determined that the communication matching with the first user equipment needs to be performed.

According to the above user equipment, the communication matching between the user equipments which support the D2D function can be performed according to the information of the user equipment and the capability of the base station, thereby avoiding the problems that the D2D communication matching procedure has failed or becomes abnormal because the base station does not support the D2D capability or the base station has limited capability of supporting D2D, thus the success rate of communication matching can be improved.

Figure 9:
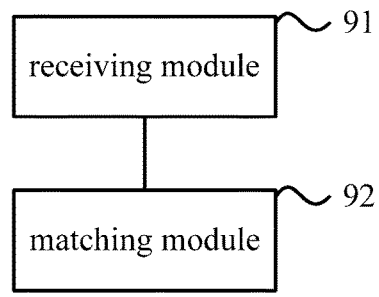
FIG. 9 is a schematic structural diagram of a base station according to an embodiment of the present invention.

FIG. 9 is a schematic structural diagram of a base station according to an embodiment of the present invention, the base station in this embodiment is the serving base station of a cell to which the second user equipment currently belongs, and can implement the process according to the embodiment of the present invention shown in FIG. 2. Referring to FIG. 9, the base station may include: a receiving module 91 and a matching module 92.

The receiving module 91 is configured to receive a connection establishment message sent by the second user equipment, wherein the connection establishment message is sent to the serving base station of the cell to which the second user equipment currently belongs after the second user equipment determines that communication matching with a first user equipment needs to be performed according to information of the first user equipment supporting the D2D function.

In this embodiment, the information of the first user equipment includes one of or a combination of: an identifier, a serving code and service information of application layer of the first user equipment; when the first user equipment is in demand of service, the information of the first user equipment further includes the demand information of the first user equipment.

Herein the identifier of the first user equipment includes one of or a combination of: an application layer identifier, a physical identifier, a NAS ID and an AS ID of the first user equipment.

For example, the application layer identifier may be a user name of the first user equipment which is represented by one of or a combination of: a character string, a number, and a character; physical identifier may be: a particular code sequence, such as IMSI; the NAS ID may be an s-TMSI or a GUTI, if the first user equipment is in idle state, the old s-TMSI or GUTI stored at the last time may be used; if the first user equipment is in connection state, the current s-TMSI or GUTI may be used; the AS ID may be a C-RNTI or a D-RNTI (i.e., the RNTI used for the D2D function).

The service information of application layer includes the service information that can be interpreted by a user, the service information that can be interpreted by a user includes service type and/or service content, for instance, the service content may be advertising information, a video of a movie or a game, and the like.

The serving code may be a character, a character string, or a number sequence, and the serving code is used for indicating the service information of application layer.

The demand information may be information such as 'want to rent' or 'want to buy'.

The matching module 92 is configured to perform the communication matching between the second user equipment and the first user equipment, according to the connection establishment message received by the receiving module and type information of a D2D capability supported by the serving base station of the cell to which the second user equipment currently belongs.

The type information of the D2D capability may include: the serving base station of the cell to which the second user equipment currently belongs supports a D2D communication function between the second user equipment and another user equipment, besides the second user equipment, which is in the cell to which the second user equipment currently belongs; or the serving base station of the cell to which the second user equipment currently belongs supports a D2D communication function between the second user equipment and another user equipment which is in another cell, besides the cell to which the second user equipment currently belongs, served by the serving base station of the cell to which the second user equipment currently belongs; or the serving base station of the cell to which the second user equipment currently belongs supports a D2D communication function between the second user equipment and another user equipment which is served by any other base station except the serving base station of the cell to which the second user equipment currently belongs; or the serving base station of the cell to which the second user equipment currently belongs supports a D2D communication function between the second user equipment and another user equipment which is served by one of limited base stations except the serving base station of the cell to which the second user equipment currently belongs; or the serving base station of the cell to which the second user equipment currently belongs supports a D2D communication function between the second user equipment and any user equipment which is in another radio access system except a radio access system to which the second user equipment belongs; where, the statement that the serving base station of the cell to which the second user equipment currently belongs supports a D2D communication function between the second user equipment and another user equipment which is served by one of limited base stations except the serving base station of the cell to which the second user equipment currently belongs, means that the serving base station of the cell to which the second user equipment currently belongs supports only the D2D connection between the second user equipment and a user equipment which is served by a base station in a range of at least one of limited base stations, except the serving base station of the cell to which the second user equipment currently belongs, when the serving base station of the cell to which the second user equipment currently belongs supports the D2D communication function between the second user equipment and another user equipment which is served by one of limited base stations except the serving base station of the cell to which the second user equipment currently belongs, the serving base station of the cell to which the second user equipment currently belongs needs to provide a list of base stations which can be possibly matched.

Figure 10:
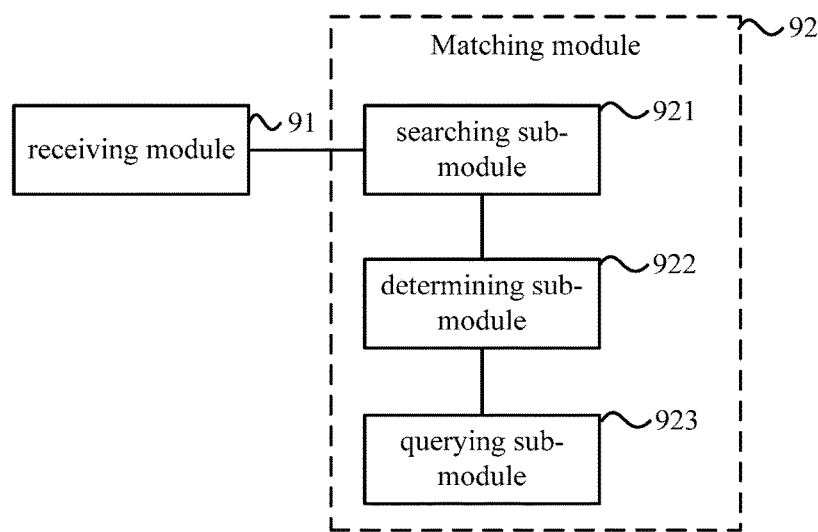
FIG. 10 is a schematic structural diagram of a base station according to another embodiment of the present invention.

According to the above base station, the communication matching between the user equipments which support the D2D function can be performed according to the information of the user equipment and the capability of the base station, thereby avoiding the problems that the D2D communication matching procedure has failed or becomes abnormal because the base station does not support the D2D capability or the base station has limited capability of supporting D2D, thus the success rate of communication matching can be improved FIG. 10 is a schematic structural diagram of a base station according to another embodiment of the present invention, comparing to the base station shown in FIG. 9, the difference is that, in an implementation of this embodiment, when the information of the first user equipment further includes information of the serving cell and/or the serving base station of the first user equipment, and the above connection establishment message carries D2D establishment type information, the identifier of the second user equipment, the identifier of the first user equipment, and information of the serving cell and/or the serving base station of the first user equipment, the matching module 92 may determine that the communication matching between the first user equipment and the second user equipment is successful, according to the information of the serving cell and/or the serving base station of the first user equipment carried in the connection establishment message, and the type information of the D2D capability supported by the serving base station of the cell to which the second user equipment currently belongs.

In another implementation of this embodiment, the matching module 92 may include: a searching sub-module 921, a determining-sub-module 922, and a querying sub-module 923. In this implementation, the above connection establishment message carries D2D establishment type information, the identifier of the second user equipment, the identifier of the first user equipment.

Herein, the searching sub-module 921 is configured to search the identifier of the first user equipment from a user equipment context stored in the base station.

The determining sub-module 922 is configured to determine that the base station is the serving base station of the first user equipment after the searching sub-module finds the identifier of the first user equipment, and to determine that the communication matching between the second user equipment and the first user equipment is successful, according to the type information of the D2D capability supported by the serving base station of the cell to which the second user equipment currently belongs.

The determining sub-module 922 is further configured to determine that the base station is not the serving base station of the first user equipment after the searching sub-module 921 does not find the identifier of the first user equipment in the user equipment context stored in the base station.

The querying sub-module 923 is configured to query to a core network device to obtain information of the serving base station of the first user equipment, after the determining sub-module 922 determines that the base station is not the serving base station of the first user equipment.

In this case, the determining sub-module 922 is further configured to determine that the communication matching between the first user equipment and the second user equipment is successful, according to the information of the serving base station of the first user equipment and the type information of the D2D capability supported by the serving base station of the cell to which the second user equipment currently belongs.

According to the above base station, the communication matching between the user equipments which support the D2D function can be performed according to the information of the user equipment and the capability of the base station, thereby avoiding the problems that the D2D communication matching procedure has failed or becomes abnormal because the base station does not support the D2D capability or the base station has limited capability of supporting D2D, thus the success rate of communication matching can be improved.

Persons of ordinary skill in the art may understand that the drawing is only a schematic diagram of a preferred embodiment, the modules or processes in the drawing may not be necessary to implement the present invention.

Persons of ordinary skill in the art may understand that the modules of the apparatus of an embodiment may distributed in the apparatus of the embodiment as described in the embodiment, may also be adjusted appropriately and may be placed in one or a plurality of apparatus different from that of the embodiment. The foregoing modules may be combined to be one module, and may also be divided into a plurality of sub-modules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features thereof, without departing from the scope of the technical solutions of embodiments of the present invention.

What is claimed is:

1. A second user equipment supporting device to device (D2D) functionality, comprising:
 a non-transitory computer-readable medium configured for storing processor-executable instructions; and
 a processor, configured to execute the processor-executable instructions for facilitating the following:
  obtaining D2D capability information of a serving base station of a cell to which the second user equipment belongs;
  obtaining information, which is broadcasted by a first user equipment supporting D2D functionality, of the first user equipment after determining that the cell to which the second user equipment belongs supports D2D functionality based on the D2D capability information; and
  performing communication matching with the first user equipment based on the information of the first user equipment and the D2D capability information,
  wherein the information of the first user equipment comprises an identifier of the first user equipment, and one of or a combination of: a serving code of the first user equipment, and service information of an application layer of the first user equipment; and wherein the identifier of the first user equipment comprises an access stratum identifier of the first user equipment.

2. The second user equipment according to claim 1, wherein obtaining the D2D capability information comprises:
receiving a broadcast message sent by the serving base station of the cell to which the second user equipment belongs, wherein the broadcast message carries the D2D capability information.

3. The second user equipment according to claim 2, wherein the D2D capability information indicates whether the serving base station of the cell to which the second user equipment belongs supports D2D functionality.

4. The second user equipment according to claim 1, wherein, when the first user equipment is in demand of service, the information of the first user equipment further comprises demand information of the first user equipment.

5. The second user equipment according to claim 1, wherein the serving code of the first user equipment identifies the service information of the application layer of the first user equipment.

6. The second user equipment according to claim 1, wherein the information of the first user equipment further comprises information of the serving cell and/or the serving base station of the first user equipment;
wherein, when the D2D capability information indicates that the serving base station of the cell to which the second user equipment belongs supports D2D functionality, the D2D capability information further comprises type information of the D2D functionality supported by the serving base station of the cell to which the second user equipment belongs;
wherein the communication matching with the first user equipment comprises:
determining that communication matching with the first user equipment needs to be performed according to the information of the first user equipment; and
determining that the communication matching with the first user equipment is successful, based on the information of the serving cell and/or the serving base station of the first user equipment.

7. The second user equipment according to claim 1, wherein the identifier of the first user equipment comprises the physical identifier of the first user equipment, and one of or a combination of: the application layer identifier of the first user equipment, the non-access stratum identifier of the first user equipment and the access stratum identifier of the first user equipment;
wherein the physical identifier is scrambled by using the identifier of the serving cell and/or the serving base station of the first user equipment; and
wherein the processor is further configured to execute the processor-executable instructions for facilitating, before performing the communication matching:
performing descrambling to the physical identifier of the first user equipment in the information of the first user equipment, by using the identifier of the serving cell or the identifier of the serving base station of the second user equipment, or by using an identifier of a neighboring cell or a neighboring base station of the second user equipment, and then obtaining the identifier of the serving cell and/or the serving base station of the first user equipment.

8. The second user equipment according to claim 1, wherein, the D2D capability information indicates that the serving base station of the cell to which the second user equipment belongs supports D2D functionality,
wherein performing the communication matching further comprises:
determining whether the communication matching with the first user equipment needs to be performed based on the information of the first user equipment; and
determining, in response to determining that the communication matching with the first user equipment needs to be performed, that the communication matching with the first user equipment is successful.

9. The second user equipment according to claim 1, wherein the first user equipment broadcasting the information of the first user equipment includes the first equipment being configured for:
obtaining, by the first user equipment, D2D capability information of a serving base station of a cell to which the first user equipment belongs;
obtaining, by the first user equipment, a resource for broadcasting the information of the first user equipment, after determining that the cell to which the first user equipment belongs supports D2D functionality according to the D2D capability information;
broadcasting, by the first user equipment, the information of the first user equipment on the obtained resource.

10. A serving base station of a cell to which a second user equipment supporting device to device (D2D) functionality belongs, comprising:
a non-transitory computer-readable medium configured for storing processor-executable instructions; and
a processor, configured to execute the processor-executable instructions for facilitating the following:
receiving a connection establishment message sent by the second user equipment, wherein the connection establishment message is based on information of a first user equipment supporting D2D functionality; and
performing communication matching between the second user equipment and a first user equipment, based on the connection establishment message and type information of D2D functionality supported by the serving base station of the cell to which the second user equipment belongs,
wherein the information of the first user equipment comprises an identifier of the first user equipment, and one of or a combination of: a serving code of the first user equipment, and service information of an application layer of the first user equipment; and
wherein the identifier of the first user equipment comprises an access stratum identifier of the first user equipment.

11. The serving base station according to claim 10, wherein the information of the first user equipment further comprises demand information of the first user equipment when the first user equipment is in demand of service.

12. The serving base station according to claim 10, wherein the serving code of the first user equipment identifies the service information of the application layer of the first user equipment.

13. The serving base station according to claim 10, wherein the information of the first user equipment further comprises information of a serving cell and/or a serving base station of the first user equipment;
wherein the connection establishment message carries D2D establishment type information, an identifier of the second user equipment, the identifier of the first user equipment, and information of the serving cell and/or the serving base station of the first user equipment;

wherein performing the communication matching further comprises:

determining that the communication matching between the second user equipment and the first user equipment is successful, based on the information of the serving cell and/or the serving base station of the first user equipment carried in the connection establishment message.

14. The serving base station according to claim 10, wherein the connection establishment message carries D2D establishment type information, an identifier of the second user equipment and the identifier of the first user equipment;

wherein performing the communication matching further comprises:

searching the identifier of the first user equipment from a user equipment context stored in the serving base station;

if the identifier of the first user equipment is found, determining that the serving base station is the serving base station of the first user equipment, and determining that the communication matching between the second user equipment and the first user equipment is successful, based on the type information of the D2D functionality supported by the serving base station of the cell to which the second user equipment belongs;

if the identifier of the first user equipment is not found in the user equipment context stored in the serving base station by the serving base station of the cell to which the second user equipment belongs, determining that the serving base station is not the serving base station of the first user equipment, and querying a core network device to obtain information of the serving base station of the first user equipment; determining that the communication matching between the second user equipment and the first user equipment is successful, based on the information of the serving base station of the first user equipment and the type information of the D2D functionality supported by the serving base station of the cell to which the second user equipment belongs.

15. A communication system, comprising:

a non-transitory computer-readable medium configured for storing processor-executable instructions; and a processor, configured to execute the processor-executable instructions for facilitating the following:

receiving a connection establishment message sent by a second user equipment supporting device-to-device (D2D) functionality, wherein the connection establishment message is sent to a serving base station of the cell to which the second user equipment belongs by the second user equipment after the second user equipment determines that communication matching with a first user equipment supporting D2D functionality needs to be performed according to information of the first user equipment; and performing communication matching between the second user equipment and the first user equipment, based on the connection establishment message and type information of D2D functionality supported by the serving base station of the cell to which the second user equipment belongs, wherein the information of the first user equipment comprises an identifier of the first user equipment, and one of or a combination of: a serving code of the first user equipment, and service information of an application layer of the first user equipment; and wherein the identifier of the first user equipment comprises an access stratum identifier of the first user equipment.

16. The communication system according to claim 15, wherein, when the first user equipment is in demand of service, the information of the first user equipment further comprises demand information of the first user equipment.

17. The communication system according to claim 15, wherein the service information of the application layer of the first user equipment comprises service type and/or service content of the first user equipment, and wherein the serving code of the first user equipment identifies the service information of the application layer of the first user equipment.

* * * * *